US012260571B2

(12) United States Patent
Cai et al.

(10) Patent No.: US 12,260,571 B2
(45) Date of Patent: Mar. 25, 2025

(54) DEPTH MAP COMPLETION IN VISUAL CONTENT USING SEMANTIC AND THREE-DIMENSIONAL INFORMATION

(71) Applicant: QUALCOMM Incorporated, San Diego, CA (US)

(72) Inventors: Hong Cai, San Diego, CA (US); Shichong Peng, Seattle, WA (US); Janarbek Matai, San Diego, CA (US); Jamie Menjay Lin, San Diego, CA (US); Debasmit Das, San Diego, CA (US); Fatih Murat Porikli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 567 days.

(21) Appl. No.: 17/650,027

(22) Filed: Feb. 4, 2022

(65) Prior Publication Data

US 2023/0252658 A1 Aug. 10, 2023

(51) Int. Cl.
*G06K 9/00* (2022.01)
*G06N 3/045* (2023.01)
(Continued)

(52) U.S. Cl.
CPC .............. *G06T 7/50* (2017.01); *G06N 3/045* (2023.01); *G06T 7/10* (2017.01); *G06T 2207/20084* (2013.01); *G06T 2207/20212* (2013.01)

(58) Field of Classification Search
CPC ............. G06K 9/00; G06V 10/82; G06T 5/70
(Continued)

(56) References Cited

U.S. PATENT DOCUMENTS 11,094,075 B1 * 8/2021 Lanman ................ G06N 3/045
2020/0134772 A1 * 4/2020 Poudel Karmatha .. G06V 10/82
(Continued)

OTHER PUBLICATIONS

Depth Estimation and Semantic Segmentation from a Single RGB Image Using a Hybrid Convolutional Neural Network Xiao Lin 12, Dalila Sánchez-Escobedo 3, Josep R Casas 4, Montse Pardàs 5 Affiliations Expand PMID: 30991663 PMCID: PMC6514714 DOI: 10.3390/s19081795 "Apr. 15, 2019" (Year: 2019).*
(Continued)

*Primary Examiner* — Seyed H Azarian
(74) *Attorney, Agent, or Firm* — QUALCOMM Incorporated

(57) ABSTRACT

Certain aspects of the present disclosure provide techniques for generating fine depth maps for images of a scene based on semantic segmentation and segment-based refinement neural networks. An example method generally includes generating, through a segmentation neural network, a segmentation map based on an image of a scene. The segmentation map generally comprises a map segmenting the scene into a plurality of regions, and each region of the plurality of regions is generally associated with one of a plurality of categories. A first depth map of the scene is generated through a first depth neural network based on a depth measurement of the scene. A second depth map of the scene is generated through a depth refinement neural network based on the segmentation map and the first depth map. One or more actions are taken based on the second depth map of the scene.

26 Claims, 5 Drawing Sheets

(51) Int. Cl.
  *G06T 7/10* (2017.01)
  *G06T 7/50* (2017.01)
(58) Field of Classification Search
  USPC ....... 382/100, 103, 128–133, 155, 162, 168, 382/173, 181, 189, 193, 207, 254, 260, 382/274, 276, 286, 291, 305, 312; 348/148, 149, 155, 143
  See application file for complete search history.

(56) References Cited

U.S. PATENT DOCUMENTS

| | | | |
|---|---|---|---|
| 2020/0241574 A1* | 7/2020 | Lin | G05D 1/0088 |
| 2020/0364870 A1* | 11/2020 | Lee | G06N 3/048 |
| 2021/0174513 A1* | 6/2021 | Chidlovskii | G06N 3/08 |
| 2021/0183083 A1* | 6/2021 | Yan | G06T 5/70 |
| 2021/0287378 A1* | 9/2021 | Du | G06N 3/045 |

OTHER PUBLICATIONS

International Search Report and Written Opinion—PCT/US2022/081810—ISA/EPO—Apr. 24, 2023.

Lu K., et al., "From Depth What Can You See? Depth Completion via Auxiliary Image Reconstruction", 2020 IEEE/CVF Conference on Computer Vision and Pattern Recognition (CVPR), IEEE, Jun. 13, 2020 (Jun. 13, 2020), pp. 11303-11312, XP033805525, DOI: 10.1109/CVPR42600.2020.01132 [retrieved on Aug. 3, 2020] abstract, figures 2,3.

Zou N., et al., "Simultaneous: Semantic Segmentation and Depth Completion with Constraint of Boundary", Sensors, vol. 20, No. 3, Jan. 23, 2020 (Jan. 23, 2020), 16 Pages, p. 635, XP055832538, DOI: 10.3390/s20030635, abstract, figure 1.

* cited by examiner

DEPTH MAP COMPLETION IN VISUAL CONTENT USING SEMANTIC AND THREE-DIMENSIONAL INFORMATION

INTRODUCTION

Aspects of the present disclosure relate to using artificial neural networks to generate depth maps for image content.

In various cases, artificial neural networks can be used to identify objects and estimate the locations of those objects in captured image content and perform various operations based on identifying objects and estimating the locations of those objects in the captured image content. The locations and estimated depths of objects in captured image content may be, for example, relative to a device that captured the image content; for example, the locations may be represented as a point in a three-dimensional plane, with one of the dimensions corresponding to a depth dimension (or a distance from the device that captured the image content).

Generally, depth detection may be performed using various ranging devices, such as radar, light detection and ranging (LIDAR) instruments, ultrasonic sensors, or other ranging devices that can estimate the distance to an object based on time-of-flight measurements. While these ranging devices may be able to produce accurate depth estimates for some objects, these ranging devices may not be able to produce accurate depth estimates for other objects due to the resolution at which these ranging devices operate. For example, these ranging devices may produce accurate depth estimates for large objects or objects close to the ranging device, but may not be able to produce accurate depth estimates for smaller objects or objects located further away from the ranging device. Because these ranging devices may not be able to produce accurate depth estimates for objects in an environment, these ranging devices may not produce sufficient information for devices that rely on these depth estimates to operate safely. For example, in an autonomous vehicle or robotics application, some objects may be associated with inaccurate depth estimates, which may lead to collisions with these objects.

Accordingly, what is needed are improved techniques for depth estimation in image content.

BRIEF SUMMARY

Certain aspects provide a method for generating a fine depth map for a scene using a machine learning model. An example method generally includes generating, through a segmentation neural network, a segmentation map based on an image of a scene. The segmentation map generally comprises a map segmenting the scene into a plurality of segments, and each segment of the plurality of segments is generally associated with one of a plurality of categories. A first depth map of the scene is generated through a first depth neural network based on a depth measurement of the scene. A second depth map of the scene is generated through a depth refinement neural network based on the segmentation map and the first depth map. One or more actions are taken based on the second depth map of the scene.

Other aspects provide processing systems configured to perform the aforementioned methods as well as those described herein; non-transitory, computer-readable media comprising instructions that, when executed by one or more processors of a processing system, cause the processing system to perform the aforementioned methods as well as those described herein; a computer program product embodied on a computer-readable storage medium comprising code for performing the aforementioned methods as well as those further described herein; and a processing system comprising means for performing the aforementioned methods as well as those further described herein.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Aspects of the present disclosure provide techniques for generating detailed (or fine) depth maps of a scene based on an image of the scene and a coarse depth map of the scene.

Object detection and depth estimation for objects in captured image content may have many applications. For example, in autonomous vehicle applications, artificial neural networks can be used to identify obstacles or other objects in the path in which an autonomous vehicle is traveling, and the identification of these obstacles or objects can be used to control the vehicle so as to avoid a collision with these obstacles or objects (e.g., by maneuvering around these obstacles, stopping before impact with an object, etc.). In extended reality (XR) applications, object detection and depth estimation can be used to integrate virtual and real-world objects, allow for interaction with virtual and real-world objects in the environment, and the like. In still another example, object detection and depth estimation may be used in various robotics applications to allow robots to navigate and interact with other physical objects in the environments in which these robots are deployed.

As discussed in further detail herein, by generating detailed depth maps based on segmentation of an image into a plurality of segments, with each segment corresponding to a unique object or class of objects in the image, aspects of the present disclosure may improve the accuracy of depth maps used in various computer vision tasks. Because these depth maps may be more accurate, various applications relying on depth information may be improved. For example, autonomous devices may have additional information that can be used for controlling these autonomous devices and thus may better detect small objects within the path of travel of an autonomous car and take action to avoid colliding with the small objects. In other scenarios, autonomous robots can perform actions while avoiding collisions with people and/or objects. Finally, with respect to extended reality scenarios, the fine depth maps can be used to more realistically locate and display various objects in the extended reality environment, which may improve the accuracy of visual effects applied to a corresponding object (e.g., visible in the real world environment in which an extended reality headset is operating.

Figure 1:
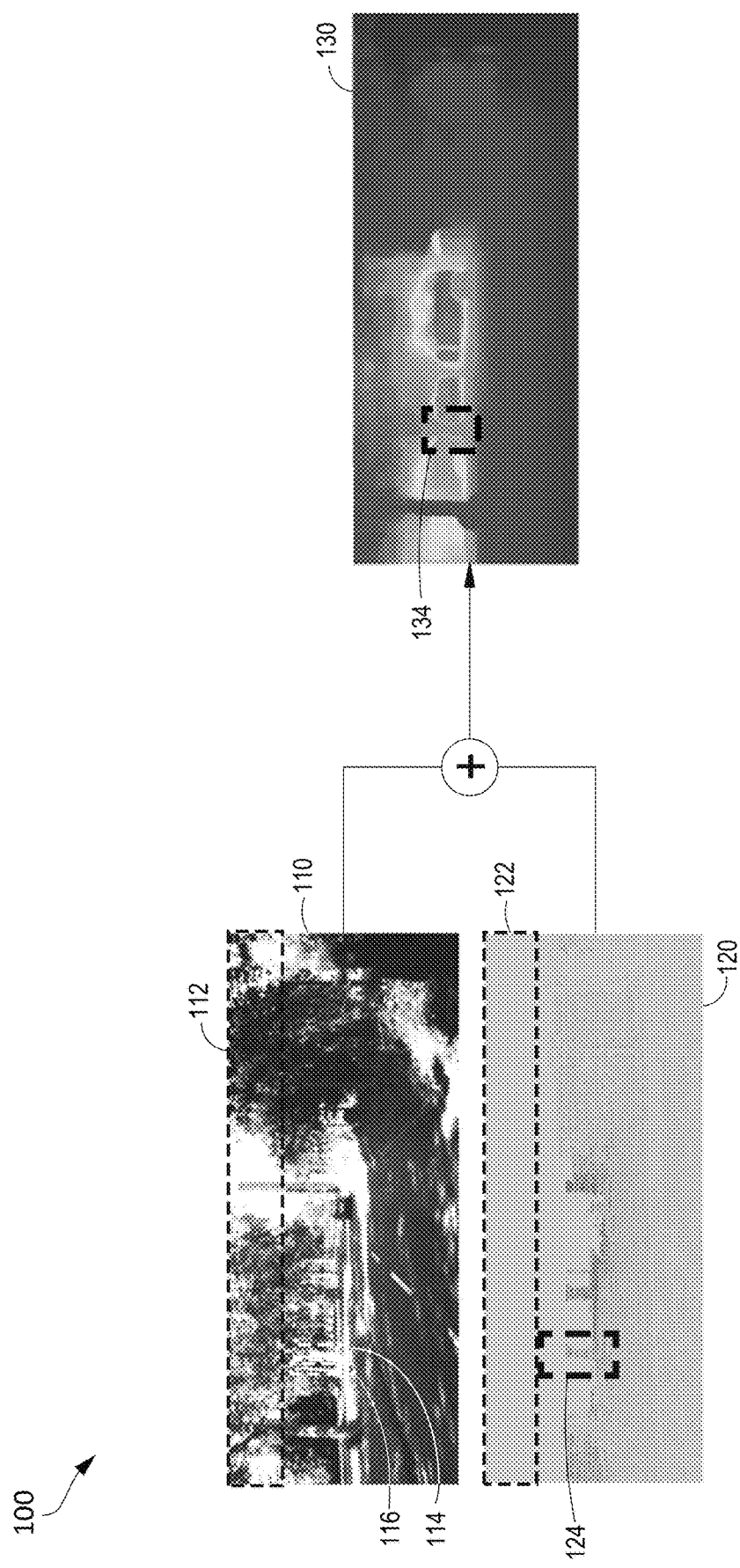
FIG. 1 depicts an example fine depth map for a scene generated from an image of the scene and a coarse depth map of the scene.

Example Fine Depth Maps for Scenes Generated Based on Images and Coarse Depth Maps of the Scene FIG. 1 depicts an example pipeline 100 for generating a depth map for a scene from an image of the scene and a sparse depth measurement of the scene.

As discussed, in various computer vision applications, multiple sensors or other devices can be used to obtain data about a scene in which the computer vision applications are being used. For example, as illustrated, an image 110 of the scene may be captured by an imaging device, such as a camera. Image 110 may show information about the scene in various spectra based on the application for which a computer vision system is being used. For example, as illustrated in FIG. 1, image 110 may be captured by one or more imaging devices used in an autonomous driving application and may include data from the visible spectrum from which information about the scene can be extracted. It should be noted, however, that this is but one example, and additional spectra may be captured and represented in image 110. For example, in various computer vision tasks, data captured in the infrared (e.g., wavelengths longer than 700 nm) and/or ultraviolet (e.g., wavelengths shorter than 400 nm) spectra may also or alternatively be included in the image 110 of the scene.

Sparse depth measurement 120 may be generated based on depth data measured by one or more sensors or other devices to obtain data about the scene in which the computer vision applications are being used. For example, sparse depth measurement 120 may be generated by various ranging devices, such as laser imaging, detection, and ranging (LIDAR) devices or radio direction and ranging (RADAR) systems. In some cases, sparse depth measurement 120 may be generated using various devices that can detect distance information at shorter distances, such as ultrasonic sensors or other devices that can detect a distance to other objects in the scene using various time-of-flight measurements.

Generally, sparse depth measurement 120 may have a lower resolution than the image 110, and thus, may be considered "sparse" relative to the resolution of image 110. For example, the sparse depth measurement 120 may include data captured at 720p resolution (e.g., 1280 pixels wide by 720 pixels tall), while the image 110 may be captured at 4K resolution (e.g., 3840 pixels wide by 2160 pixels tall). Because the sparse depth measurement 120 and the image 110 may have a different spatial resolution but cover a same field of view, sparse depth measurement 120, when upsized to the same spatial resolution as image 110, may include data for only a subset of the pixels in image 110. That is, when sparse depth measurement 120 is upsized to the same spatial resolution as image 110, the sparse depth measurement 120 may include depth measurements for only portions of the image 110 and may include null data interspersed between different depth measurements in the sparse depth measurement 120.

In some cases, sparse depth measurement 120 and image 110 may cover different fields of view in the scene captured in image 110 and sparse depth measurement 120. For example, as illustrated in FIG. 1, image 110 may include usable information over a larger vertical field of view than sparse depth measurement 120. Section 112 of image 110 may correspond to section 122 of sparse depth measurement 120. In this example, because a sensor used to generate sparse depth measurement 120 may not have a sufficient vertical field of view to measure section 122, the sparse depth measurement 120 may include no usable data in section 122 even though the corresponding section 112 in image 110 includes one or more objects that may be detected as part of a computer vision task.

Further, image 110 may include objects of varying sizes and at varying distances. Generally, an object that is closer to the device that captured image 110 may appear larger than the same object when such object is further away from the device that captured image 110. In some cases, the objects may be small enough (e.g., a small number of pixels in width and height) such that such objects are not detected using may object detection algorithms that are trained to identify objects in an image of a scene. Further, because, as discussed, the devices used to generate the sparse depth measurement 120 may have a low resolution, distance information for some objects may be sparse or nonexistent in the sparse depth measurement 120. These objects may include, for example, thin objects, such as tree trunks, light poles (both vertical and horizontal), and/or other objects towards the background of a scene in which object detection is used (e.g., in a self-driving automobile scenario). In the example illustrated in FIG. 1, it may be seen that a wide tree trunk 114 and a thin tree trunk 116 are pictured in the image of the scene. However, because of the sparsity of the depth measurements, sparse depth measurement 120 may include depth data 124 corresponding to the wide tree trunk 114, but may not include depth data corresponding to the thin tree trunk 116. Because the sparse depth measurement 120 may not have a sufficient resolution to detect such objects, the depth map 130 generated from the sparse depth measurement 120 and image 110 may result in object distance predictions that are erroneous or nonexistent, which may complicate operations in which object detection and distance information may be important for operating without colliding with objects in the environment in which a device is being used.

Depth map 130 may be generated by combining information from image 110 and sparse depth measurement 120. In this example, darker shades of grey generally represent objects that are closer in distance to the devices that captured the image 110 and sparse depth measurement 120, while lighter shades of grey generally represent objects that are further away from the devices that captured the image 110 and sparse depth measurement 120. In examples, where depth map 130 is colorized, different colors may represent different depths, or distances from the devices that captured the image 110 and sparse depth measurement 120. For example, the wavelengths of colors in a colorized depth map may be a proxy for distance, with colors with shorter wavelengths (e.g., colors in the blue or purple spectrum) corresponding to closer depths than colors with longer wavelengths, with colors in the red spectrum representing objects that are a furthest distance away from the devices that captured the image 110 and sparse depth measurement 120. Generally, depth map 130 may include more depth information than sparse depth measurement 120. This additional depth information, relative to sparse depth measurement 120, may be based on inferences based on the depth information of neighboring depth points in the map and, in some aspects, information included in the image 110. However, as discussed, because the coarse depth map may not include data at a sufficient resolution to detect certain types of objects (e.g., small objects, objects that are far away, objects with one or more dimensions that are small (e.g., thin, slim, or narrow objects), etc.), depth map 130 may also not include such information. For example, while the thin tree trunk 116 may be seen in image 110, the lack of depth measurements for the thin tree trunk 116 in sparse depth measurement 120 may result in the depth map 130 also lacking distance information for this thin tree trunk.

To improve the resolution of depth maps that can be used in various computer vision applications, aspects of the present disclosure use semantic segmentation in the generation of a depth map with increased resolution and inclusion of small objects relative to depth maps generated based on typical techniques, as discussed above.

Figure 2:
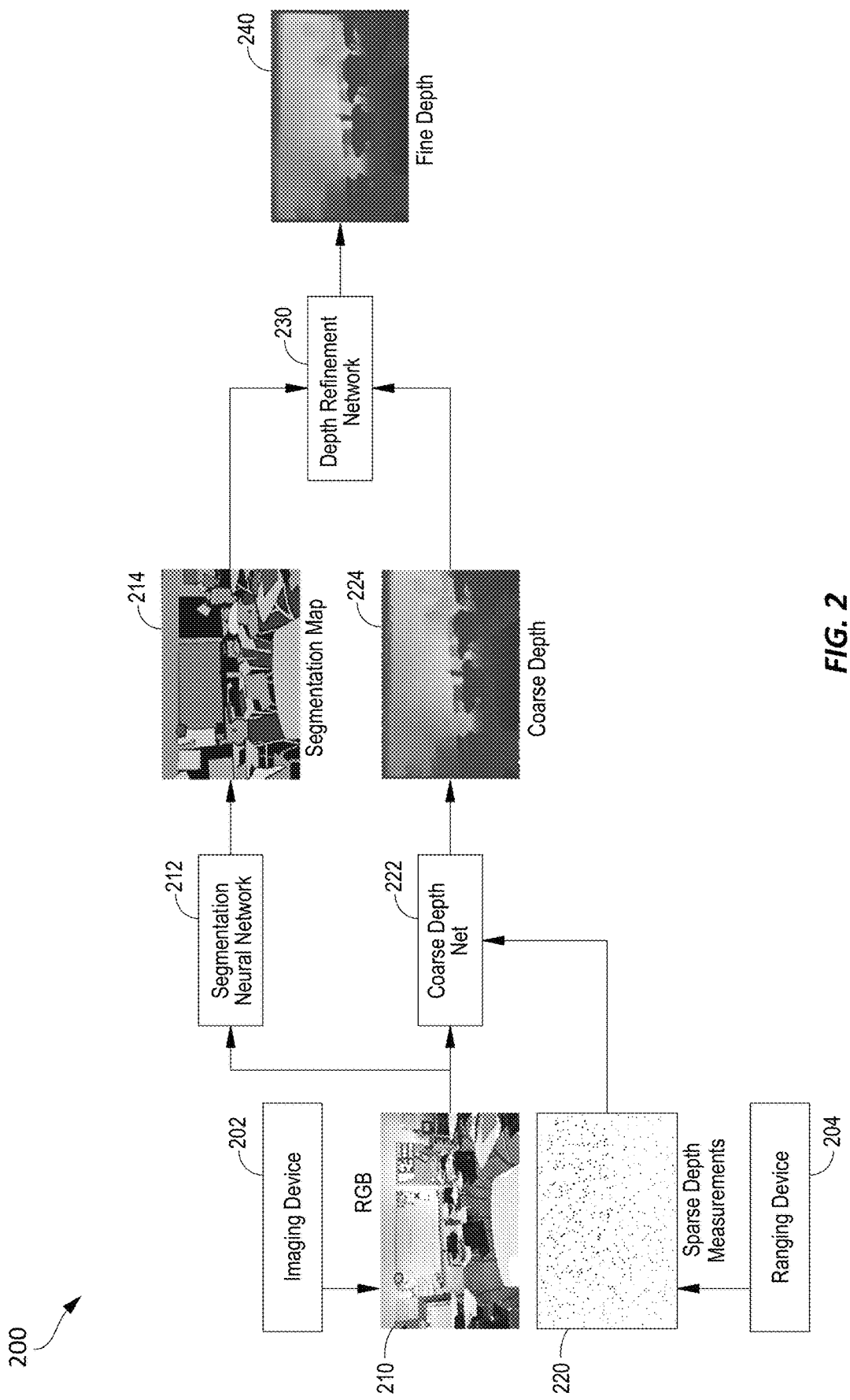
FIG. 2 depicts an example pipeline for generating a fine depth map for a scene based on an image of the scene and a coarse depth map of the scene.

FIG. 2 illustrates an example pipeline 200 for generating a fine depth map for a scene based on an image of the scene and a coarse depth map of the scene, according to aspects of the present disclosure. As illustrated, pipeline 200 begins with receiving an image 210 of a scene and sparse depth measurements 220 of the scene. As discussed, image 210 may be generated by one or more imaging devices (e.g., imaging device 202), and sparse depth measurements 220 may be generated by one or more ranging devices (e.g., ranging device 204) to generate a coarse depth map representing the scene. In some aspects, sparse depth measurements 220 may be an image in color, with different colors representing a different relative depth of objects included in the image 210.

Segmentation generally allows for an image to be segmented into different classifications, with each classification being associated with a type of object within the scene. In some aspects, segmentation may be performed using semantic segmentation, which may be performed on a per-pixel basis to classify each pixel in the image to one of a plurality of classes (corresponding to classes of objects in a scene, for example). To do so, aspects of the present disclosure may pass image 210 through a segmentation neural network 212 in order to identify objects in the image 210. Generally, various object detection techniques can be used to identify different objects in the scene in order to generate segmentation map 214 in which the image is segmented into a plurality of classes associated with the identified objects in the scene. For example, object detection may be performed using various artificial neural networks, such as convolutional neural networks, attention-based neural networks, or other networks that can be used for such a task. In some aspects, segmentation neural network 212 may generate segmentation map 214 using instance segmentation techniques, which identifies and localizes objects in the scene captured in image 210. A segmentation map 214 generated by segmentation neural network 212 using instance segmentation techniques may thus include information identifying each object uniquely with the type of the object and an identifier differentiating different instances of a same type of object in the segmentation map 214.

Segmentation map 214 illustrating the classifications of objects in image 210 may be output from segmentation neural network 212. Segmentation neural network 212 generally applies semantic segmentation to an image 210 to identify objects in the image 210, and each class of object may be associated with a unique representation (e.g., color, pattern, etc.) in the segmentation map 214. Generally, segmentation neural network 212 may be a neural network trained to identify various objects in images, such as a convolutional neural network, attention-based neural networks, or other neural networks that can perform object detection tasks.

In the example illustrated in FIG. 2, image 210 is an image of a room including a whiteboard, a bulletin board, a plurality of desks, and a plurality of chairs. When processed by segmentation neural network 212, the objects in image 210 may be assigned different representations to generate segmentation map 214. Each representation may correspond to a different class of object and may be visualized, for convenience, as a unique color, pattern, or other representation. In this example, the whiteboard may be a first class of object, the bulletin board may be a second class of object, each of the desks may be a third class of object, each of the plurality of chairs may be a fourth class of object, and so on. Of course, it should be recognized that these are only examples of classes of objects that can be detected in an image of a scene and used in generating a fine depth map for the scene, and other classes of objects may be detected in a scene (e.g., based on the environments in which the techniques discussed herein are used and the objects expected to be encountered in such environments).

Meanwhile, coarse depth network 222 may take the sparse depth measurements 220 generated by ranging device 204 (e.g., LIDAR, radar, ultrasonic sensors, etc.) and image 210 and process these sparse depth measurements 220 and image 210 in order to generate a coarse depth map 224. The coarse depth map 224 may generally include estimated depth measurements of the scene across the entirety of the scene as illustrated in image 210. In some aspects, the coarse depth network 224 can represent a rough approximation of the depth of the scene and may be generated based on depth completion techniques that fill out depth information for a scene from the sparse depth measurement 220. These depth completion techniques may generally include the use of encoder-decoder neural networks to estimate a coarse depth map from sparse depth measurements 220, or other techniques that expand on a sparse input to generate a non-sparse output.

To refine the coarse depth map 224 and generate a fine depth map that includes depth measurements with a higher fidelity than coarse depth map 224, the segmentation map 214 and the coarse depth map 224 may be input into depth refinement network 230 for further processing. Generally, depth refinement network 230 combines information from the coarse depth map 224 and the segmentation map 214 on a per-class basis in order to generate fine depth map 240. In generating the fine depth map 240, image 210 may be segmented into a plurality of segments, with each segment being associated with different objects in the segmentation map 214, and masks may be applied for each segment of the image 210 in order to generate fine depth measurements for inclusion in fine depth map 240.

For example, assume that C classes of object are identified in image 210, and thus, image 210 may be divided into C segments, with each segment corresponding to a specific class of object identified in image 210. For the first segment, a mask may be generated that masks out data not associated with the object associated with the first segment. This may similarly be performed for each of the other segments (and associated objects) 2 through C in segmentation map 214.

Each segment, and the corresponding mask, may be combined in depth refinement network 230 to allow for depth information to be considered for a group of similar objects. Three-dimensional coordinates may be generated for each pixel in the segmentation map 214 associated with an object associated with a specific segment in the image 210, and a three-dimensional coordinate output may be generated for each pixel in the segmentation map 214. In some aspects, the three-dimensional coordinates from the coarse depth map 224 may be used as weights in the depth refinement network 230.

Generally, depth refinement network 230 may generate a fine depth map 240 based on three-dimensional coordinate information for each segment into which the image 210 is segmented, as discussed in further detail below with respect to FIG. 3. Each segment may have three-dimensional coordinate information for unmasked portions of the segmentation map 214 associated with image 210 and may have zero or null data for masked portions of the segmentation map 214. Because each segment may be associated with a unique portion of the image 210 that generally does not overlap with other portions of the image 210, the segments may be combined through a combiner block to generate the fine depth map 240. The resulting fine depth map may be subsequently used for various computer vision tasks, such as autonomous driving, autonomous robotics control, generation of extended reality scenes, and the like.

Figure 3:
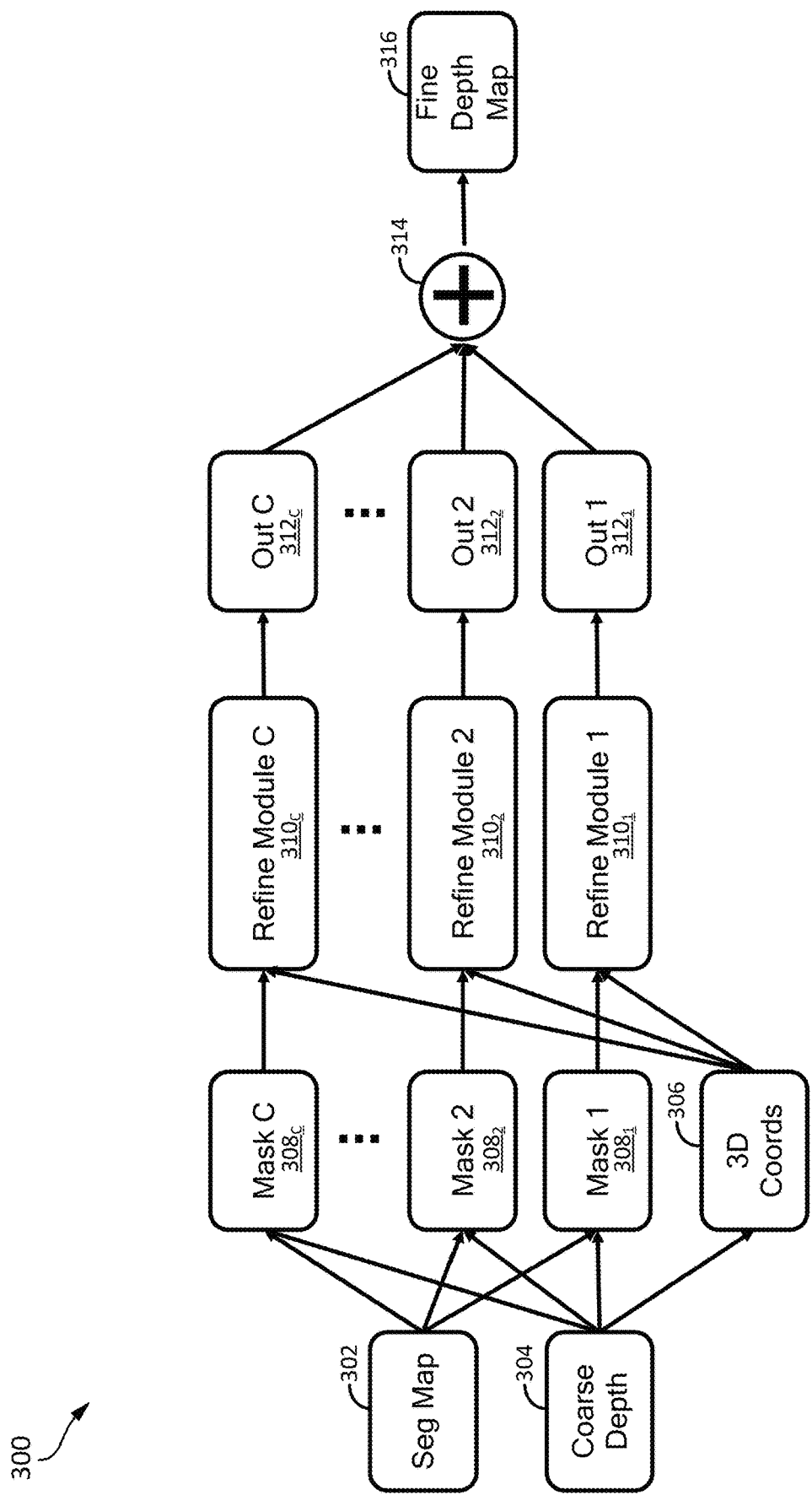
FIG. 3 depicts an example architecture of a network that generates a fine depth map for a scene based on an image of the scene and a coarse depth map of the scene.

FIG. 3 illustrates an example architecture 300 of a depth refinement network (e.g., depth refinement network 230 illustrated in FIG. 2) that generates a fine depth map for a scene based on an image of the scene, a segmentation map of the image of the scene, and a coarse depth map of the scene, according to aspects of the present disclosure.

As illustrated, architecture 300 receives a segmentation map 302 (e.g., segmentation map 214 illustrated in FIG. 2) and a coarse depth map 304 (e.g., coarse depth map 224 illustrated in FIG. 2) as input. As discussed, the segmentation map 302 may be an image or other data illustrating the presence of various objects within a scene. The coarse depth map 304 may be a depth map generated based on depth completion techniques from the image of the scene and a sparse set of depth measurements, and the coarse depth map 304 may include three-dimensional depth information for at least a part of the scene covered in the image.

To generate the fine depth map for the scene, architecture 300 may divide the segmentation map 302 into C segments. Each segment may correspond to a specific type or class of object in the scene. By dividing the segmentation map into a plurality of segments, with each segment being associated with a specific type or class of object, architecture 300 may refine the depth measurements for the scene on a per-object-type basis. Returning to the example discussed above with respect to FIG. 2, thus, architecture 300 may refine depth measurements for the chairs in the image 210 separately from the depth measurements for the tables in the image 210, which may both be refined separately from the depth measurements for the whiteboard in the image 210, and so on.

Based on the segmentation of the segmentation map 302 into the C segments, C masks may be generated to allow for the depth refinement network to refine depth measurements for each specific segment in the segmentation map 302. To do so, masks $308_1$ through $308_C$ may be generated for the respective segments 1 through C. Each mask may indicate where a specific type or class of object is located in the image of the scene and may exclude information about other objects in the scene. Thus, a mask 308 may mask out information about data that is irrelevant to a specific type or class of object detected in the image of the scene.

A plurality of refinement modules 310 may be used to refine the depth map generated for each segment in segmentation map 302. Generally, each refinement module 310 may be associated with a corresponding mask 308 associated with a segment into which segmentation map 302 is segmented. That is, refinement module $310_1$ may refine the depth map generated for the segment associated with mask $308_1$, refinement module $310_2$ may refine the depth map generated for the segment associated with mask $308_2$, and so on. To refine the depth map for each segment in segmentation map 302, which, as discussed, is associated with a specific type of object in the image of the scene, a refinement module 310 may receive as input a corresponding mask and the three-dimensional coordinates 306 included in coarse depth map 304. For example, as illustrated, refinement module $310_1$, which may be configured to refine the depth map for segment 1 in the segmentation map 302, may receive as input the corresponding mask $308_1$ and the three-dimensional coordinates 306 included in coarse depth map 304. Similarly, refinement module $310_2$ may be configured to refine the depth map for segment 2 in the segmentation map 302 and may receive as input the corresponding mask $308_2$ and three-dimensional coordinates 306. This may be performed (e.g., in parallel or substantially in parallel) for each segment in the segmentation map up to segment C.

Each refinement module 310 generally is configured to refine the depth measurements for a segment in segmentation map by considering the depth information for that specific semantic group of objects in the image of the scene. Generally, each refinement module 310 may be a convolutional neural network, and the three-dimensional coordinates associated with a specific segment can be used as weights within the convolutional neural network. The refinement modules 310 may, in some aspects, refine the fine depth measurements on a per-pixel basis. The output 312 of each refinement module 310 may thus correspond to the three-dimensional coordinates, refined by refinement module 310 for the class of object with which the refinement module 310 is associated. As discussed, because the refinement module 310 operates based on a mask, areas that are masked out by the corresponding mask (which allows for data for only a specific type of object to be processed in a specific refinement module 310) may have null data. Because the masked areas of each mask $308_1$ through $308_C$ may result in the corresponding outputs $312_1$ through $312_C$ having null data (or zero values) for those masked areas, outputs $312_1$ through $312_C$ may be combined into a fine depth map 316 without the depth values from one output 312 affecting the depth values for a different output 312.

To generate fine depth map 316, outputs $312_1$ through $312_C$ may be input into a combiner 314. In some aspects, combiner 314 may be configured to generate an output fine depth map 316 based on a per-pixel summation of each output $312_1$ through $312_C$. In some aspects, combiner 314 may be configured to generate the output based on a color space in which some colors represent shorter distances between the imaging device that captured the image of the scene and objects in the scene and other colors represent longer distances between the imaging device and objects in the scene.

Generally, the segments into which segmentation map 302 can be divided, and correspondingly, the segments for which each refinement module 310 can be configured to process, may be predefined for a neural network that generates segmentation map 302 from a received image of a scene. These segments may be tailored, for example, based on a defined importance of an object for a given depth estimation class. For example, in an autonomous vehicle application, classes of objects such as people, light poles, road signs, and other vehicles may be considered classes of objects for which accurate depth values may be desired, while other classes of objects such as the sky or the driving surface (e.g., asphalt) may be classes of objects for which accurate depth values may not be needed. The classes of objects identified as classes for which accurate depth values may not be needed may be omitted from consideration within the architecture 300 such that refinement modules 310 are implemented and used to generate fine depth information only for classes of objects identified as classes for which accurate depth values are desired.

Fine depth map 316 may be output for use in various computer vision tasks. As discussed, in an autonomous vehicle application, the fine depth map 316 may be used to determine whether objects are in the path in which the autonomous vehicle is traveling. If an object is detected along the path in which the autonomous vehicle is traveling, various control inputs can be applied to avoid the object. For example, objects in the fine depth map that are close in proximity to the autonomous vehicle and in the path of travel may cause the autonomous vehicle to both apply the brakes and apply a steering input to attempt to avoid the object. Detection of objects in the fine depth map that are indicated as being somewhat distant from the autonomous vehicle, but potentially in the path of travel of the autonomous vehicle, may cause the autonomous vehicle to apply the brakes to slow down the autonomous vehicle or to apply a steering input to redirect the path of travel away from the object. In autonomous vehicle applications, by generating a fine depth map that includes more depth detail than a coarse depth map and using the fine depth map to detect obstacles in the path of travel of the autonomous vehicle, aspects of the present disclosure may allow for autonomous vehicles to detect and avoid objects that may not be identified using coarse depth maps.

In another example, in an extended reality application, virtual effects may be added into a scene with parameters and sizes set based on the distances in the fine depth map. For example, placing artificially generated lighting effects in an extended reality scene may be based on the fine depth map 316 such that lighting effects placed on objects that are closer in proximity to an extended reality device may be rendered with increased intensity relative to lighting effects placed on objects that are further away from the extended reality device. Further, other virtual objects may be added into an extended reality rendering of the scene with realistic sizing based on the distance from the extended reality device to the locations at which these objects are added. Thus, aspects of the present disclosure may provide for improved realism in the rendering of digital effects and objects in extended reality applications, especially when effects or objects are rendered on small objects in the scene that may not be detected or recognized in a coarse depth map.

Of course, it should be noted that these are but examples of applications in which the fine depth map 316 may be used, and other tasks may be amenable to the depth map refinement techniques discussed herein with various improvements to the accuracy of depth mapping and operations performed based on such depth mapping, for example, with respect to small and/or distant objects that may not be detected in a coarse depth map completed using typical depth completion techniques that generate coarse depth maps from sparse depth measurements.

Figure 4:
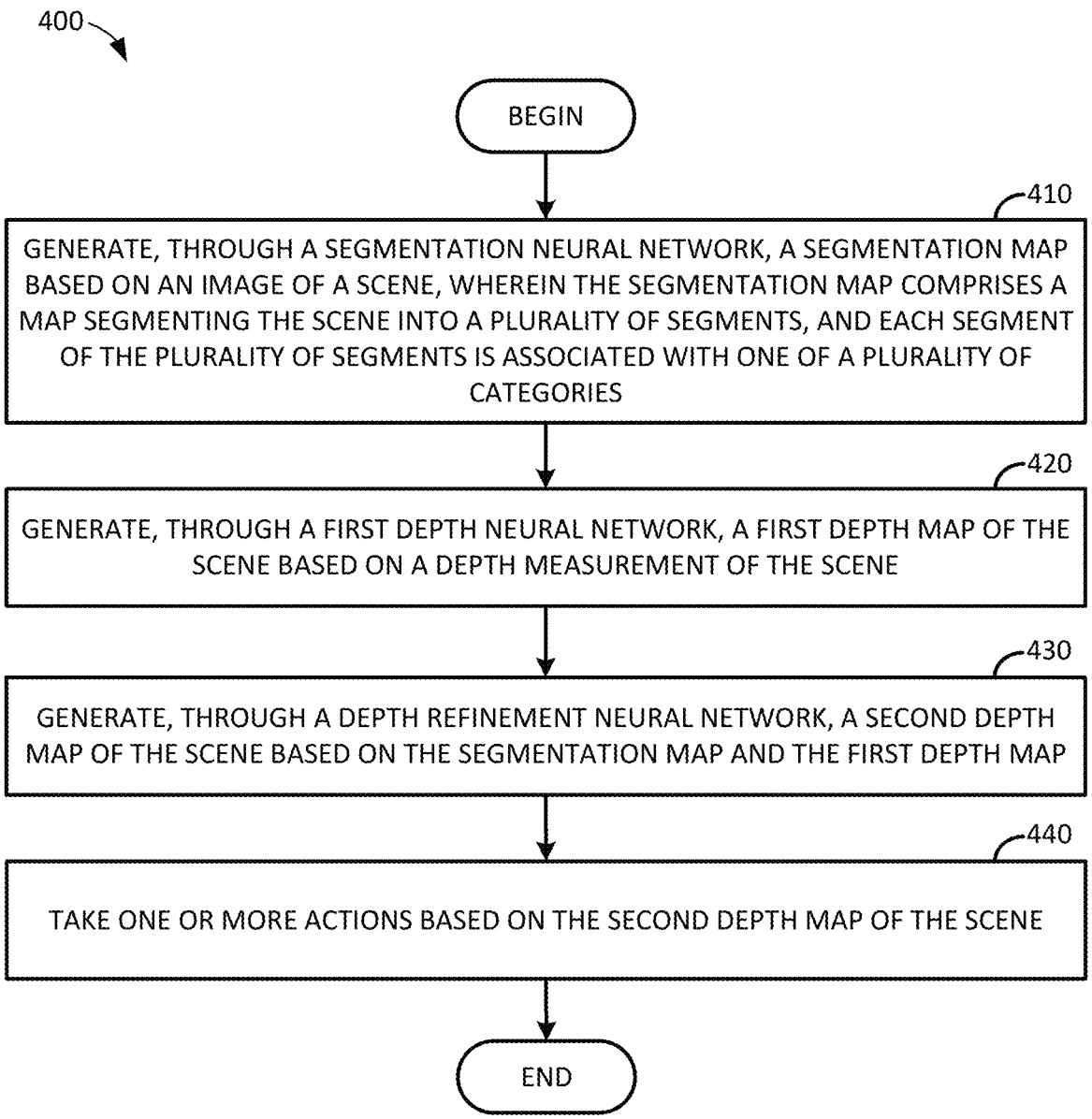
FIG. 4 depicts example operations for generating a fine depth map for a scene based on an image of the scene and a coarse depth map of the scene, according to aspects of the present disclosure.

FIG. 4 illustrates example operations 400 that may be performed for generating a fine depth map for a scene based on an image of the scene and a coarse depth map of the scene, according to certain aspects of the present disclosure. Operations 400 may be performed on a device, such as processing system 500 illustrated in FIG. 5, or any device that can be used in a computer vision task, such as an autonomous motor vehicle, a robot, an extended reality rendering system, or the like.

As illustrated, operations 400 begin at block 410, where a segmentation map, such as segmentation map 214 illustrated in FIG. 2, is generated based on an image of a scene through a segmentation neural network. Generally, the segmentation map includes a map semantically segmenting the scene into a plurality of segments, and each segment of the plurality of segments may be associated with one of a plurality of categories. For example, each segment may be associated with a specific class of object detected in a scene. In an autonomous vehicle example, for example, segments may correspond to other vehicles, pedestrians, road signs, stop lights, driving surfaces, non-driving surfaces, and the like.

At block 420, a first depth map, such as coarse depth map 224 illustrated in FIG. 2, of the scene is generated through a first depth neural network based on a depth measurement of the scene. The depth measurement of the scene may be, for example, a sparse set of depth measurement data generated through various ranging devices, such as LIDAR, radar, ultrasonic sensors, and the like. In some aspects, the depth measurement may include depth measurements spanning a portion of a height of the image of the scene on a first axis and spanning a length of the image on a second axis. For example, the depth measurement may cover the same horizontal field of view as the image of the scene but a smaller vertical field of view than the image of the scene.

In some aspects, the first depth map (e.g., coarse depth map) may have a lower resolution than the image of the scene. In such a case, the first depth map may be upsized or the image of the scene may be downsized such that the first depth map and the image of the scene have the same spatial resolution.

In some aspects, the depth measurements may be a sparse depth measurement of the scene having a lower spatial resolution than the image of the scene. The first depth map may be generated by interpolating depth measurements for unmeasured portions of the scene from the sparse depth measurement, which, as discussed, may include measurements for only a subset of locations in the scene. Interpolation of the depth measurements to generate the first depth map may be generated, for example, using an encoder-decoder neural network to encode the sparse depth measurement into an embedding space and generate a first depth map based on the encoding of the sparse depth measurement into one or more points in the embedding space.

At block 430, a second depth map, such as fine depth map 240 illustrated in FIG. 2 and/or fine depth map 316 illustrated in FIG. 3, of the scene is generated through a depth refinement neural network, based on the segmentation map and the first depth map. Generally, the second depth map may be generated as discussed above with respect to FIG. 3 and may be a "finer" depth map having finer depth detail than the first depth map (e.g., a coarse depth map).

In some aspects, generating the second depth map of the scene may include generating a plurality of masks (e.g., masks $308_1$-$308_C$ illustrated in FIG. 3) based on the segmentation map (e.g., segmentation map 214 illustrated in FIG. 2 and/or segmentation map 302 illustrated in FIG. 3) and the first depth map (e.g., coarse depth map 224 illustrated in FIG. 2 and/or coarse depth map 304 illustrated in FIG. 3). Each mask generally corresponds to one of the plurality of segments. For example, as discussed, each mask may correspond to a specific object or class of objects detected in an image of the scene. A plurality of enhanced depth masks may be generated based on the plurality of masks and three-dimensional coordinate information derived from the first depth map as input into the depth refinement neural network. Each enhanced depth mask of the plurality of enhanced depth masks corresponds to one of the plurality of regions. The plurality of enhanced depth masks are combined into the second depth map of the scene.

In some aspects, the depth refinement neural network generates each output mask of the plurality of enhanced depth masks based on one or more convolutional layers of a neural network. Each convolutional layer may be configured to apply weights and/or biases based on a proximity of pixels in the scene in a three-dimensional space.

At block 440, one or more actions are taken based on the second depth map of the scene. The one or more actions may be associated with the task in which computer vision is used. For example, for autonomous vehicle control tasks, the one or more actions may include comprises controlling a motor vehicle based on the second depth map. For example, the one or more actions may include accelerating the motor vehicle (e.g., when no objects are located on the path of travel for the motor vehicle), braking the motor vehicle, applying a steering input to the motor vehicle to avoid obstacles in the current path of travel of the motor vehicle.

In some aspects, in an extended reality application, an extended reality scene may be generated by combining the scene and one or more virtual scenes based on the second depth map, and the extended reality scene may be displayed on a display device. Objects, for example, may be sized and may have lighting effects applied thereto based on distances between different objects in the scene. Generally, for an object with a defined size, such objects may appear larger if placed on objects in the scene that are closer to an extended reality headset and may appear smaller if placed on objects in the scene that are further away from the extended reality headset. In another example, lighting effects may be adjusted based on the distance between the extended reality headset and the object on which such lighting effects are to be rendered.

In some aspects, the one or more actions may be related to controlling a robot in a confined environment. The one or more actions may include controlling a robot to interact with one or more physical objects in the scene based on the second depth map. For example, the robot may interact with one or more physical objects in the scene (e.g., move, pick up, add, etc.) while avoiding collisions with other physical objects in the scene.

Figure 5:
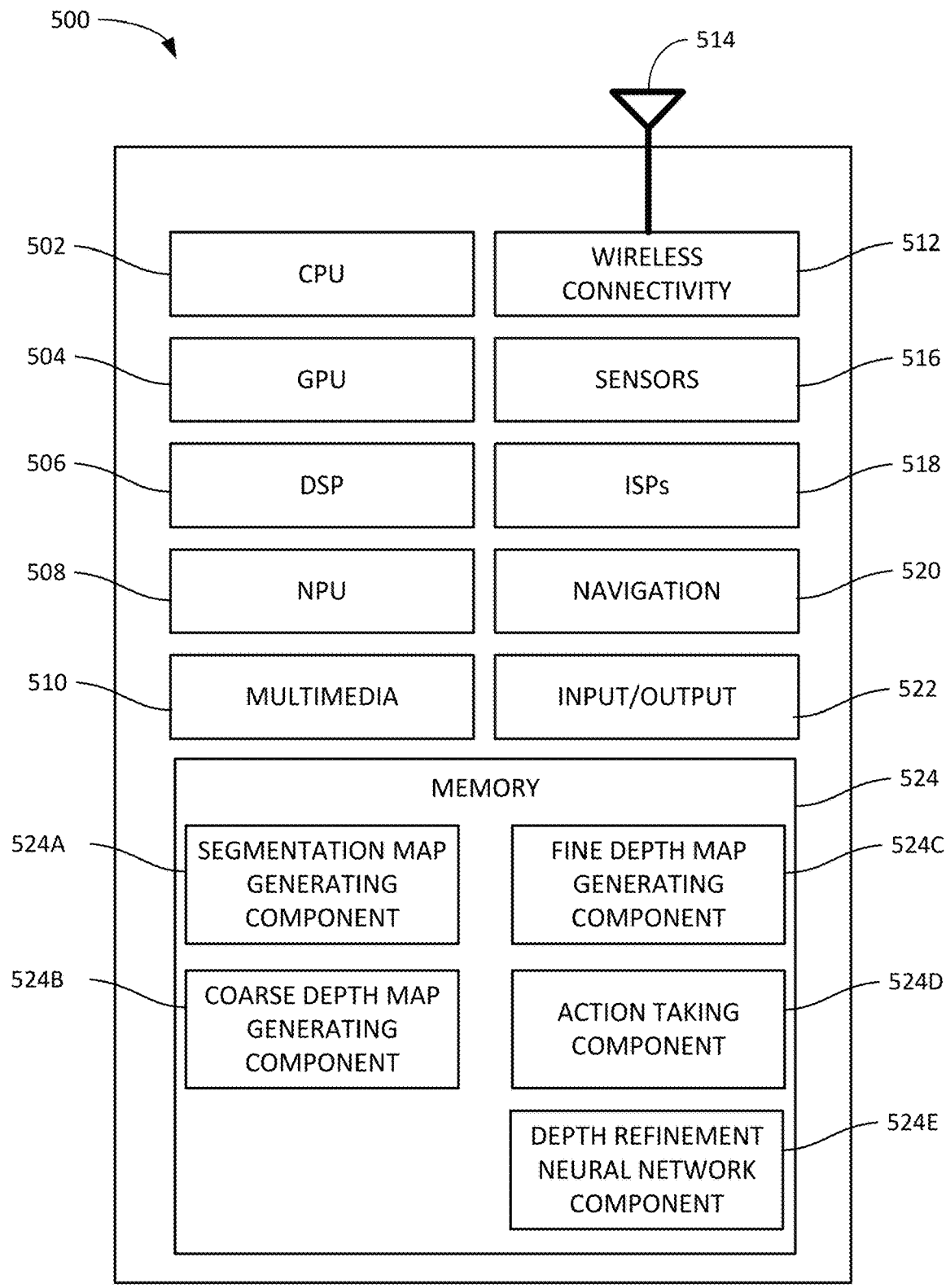
FIG. 5 depicts an example implementation of a device on which a fine depth map for a scene can be generated based on an image of the scene and a coarse depth map of the scene, according to aspects of the present disclosure.

Example Processing System for Generating a Fine Depth Map for a Scene Based on an Image of the Scene and a Coarse Depth Map of the Scene FIG. 5 depicts an example processing system 500 for generating fine depth maps of a scene based on an image of a scene and a coarse depth map for use in various computer vision tasks, such as described herein for example with respect to FIG. 4.

Processing system 500 includes a central processing unit (CPU) 502, which in some examples may be a multi-core CPU. Instructions executed at the CPU 502 may be loaded, for example, from a program memory associated with the CPU 502 or may be loaded from a memory partition 524.

Processing system 500 also includes additional processing components tailored to specific functions, such as a graphics processing unit (GPU) 504, a digital signal processor (DSP) 506, a neural processing unit (NPU) 508, a multimedia processing unit 510, a multimedia processing unit 510, and a wireless connectivity component 512.

An NPU, such as NPU 508, is generally a specialized circuit configured for implementing all the necessary control and arithmetic logic for executing machine learning algorithms, such as algorithms for processing artificial neural networks (ANNs), deep neural networks (DNNs), random forests (RFs), and the like. An NPU may sometimes alternatively be referred to as a neural signal processor (NSP), tensor processing units (TPU), neural network processor (NNP), intelligence processing unit (IPU), vision processing unit (VPU), or graph processing unit.

NPUs, such as NPUs 508, are configured to accelerate the performance of common machine learning tasks, such as image classification, machine translation, object detection, and various other predictive models. In some examples, a plurality of NPUs may be instantiated on a single chip, such as a system on a chip (SoC), while in other examples they may be part of a dedicated neural-network accelerator.

NPUs may be optimized for training or inference, or in some cases configured to balance performance between both. For NPUs that are capable of performing both training and inference, the two tasks may still generally be performed independently.

NPUs designed to accelerate training are generally configured to accelerate the optimization of new models, which is a highly compute-intensive operation that involves inputting an existing dataset (often labeled or tagged), iterating over the dataset, and then adjusting model parameters, such as weights and biases, in order to improve model performance. Generally, optimizing based on a wrong prediction involves propagating back through the layers of the model and determining gradients to reduce the prediction error.

NPUs designed to accelerate inference are generally configured to operate on complete models. Such NPUs may thus be configured to input a new piece of data and rapidly process the new piece of data through an already trained model to generate a model output (e.g., an inference).

In one implementation, NPU 508 is a part of one or more of CPU 502, GPU 504, and/or DSP 506.

In some examples, wireless connectivity component 512 may include subcomponents, for example, for third generation (3G) connectivity, fourth generation (4G) connectivity (e.g., 4G LTE), fifth generation connectivity (e.g., 5G or NR), Wi-Fi connectivity, Bluetooth connectivity, and other wireless data transmission standards. Wireless connectivity processing component 512 is further connected to one or more antennas 514.

Processing system 500 may also include one or more sensor processing units 516 associated with any manner of sensor (e.g., ranging sensors, such as LIDAR, radar, ultrasonic sensors, etc., corresponding to ranging device 204 illustrated in FIG. 2), one or more image signal processors (ISPs) 518 associated with any manner of image sensor (e.g., a camera unit including an imaging sensor and a lens that can capture an image of a scene, such as imaging device 202 illustrated in FIG. 2), and/or a navigation processor 520, which may include satellite-based positioning system components (e.g., GPS or GLONASS) as well as inertial positioning system components.

Processing system 500 may also include one or more input and/or output devices 522, such as screens, touch-sensitive surfaces (including touch-sensitive displays), physical buttons, speakers, microphones, and the like.

In some examples, one or more of the processors of processing system 500 may be based on an ARM or RISC-V instruction set.

Processing system 500 also includes memory 524, which is representative of one or more static and/or dynamic memories, such as a dynamic random access memory, a flash-based static memory, and the like. In this example, memory 524 includes computer-executable components, which may be executed by one or more of the aforementioned processors of processing system 500.

In particular, in this example, memory 524 includes segmentation map generating component 524A, coarse depth map generating component 524B, fine depth map generating component 524C, action taking component 524D, and depth refinement neural network component 524E. The depicted components, and others not depicted, may be configured to perform various aspects of the methods described herein.

Generally, processing system 500 and/or components thereof may be configured to perform the methods described herein.

Example Clauses

Clause 1: A method, comprising: generating, through a segmentation neural network, a segmentation map based on an image of a scene, wherein the segmentation map comprises a map segmenting the scene into a plurality of segments, each segment of the plurality of segments being associated with one of a plurality of categories; generating, through a first depth neural network, a first depth map of the scene based on a depth measurement of the scene; generating, through a depth refinement neural network, a second depth map of the scene based on the segmentation map and the first depth map; and taking one or more actions based on the second depth map of the scene.

Clause 2: The method of Clause 1, wherein generating the second depth map of the scene comprises: generating a plurality of masks based on the segmentation map and the first depth map, each mask corresponding to one of the plurality of segments; generating a plurality of enhanced depth masks based on the plurality of masks and three-dimensional coordinate information derived from the first depth map as input into the depth refinement neural network, wherein each enhanced depth mask of the plurality of enhanced depth masks corresponds to one of the plurality of segments; and combining the plurality of enhanced depth masks into the second depth map of the scene.

Clause 3: The method of Clause 2, wherein the depth refinement neural network generates each output mask of the plurality of enhanced depth masks based on a convolutional kernel configured to apply weights based on a proximity of pixels in the scene in a three-dimensional space.

Clause 4: The method of any one of Clauses 1 through 3, wherein the depth measurement of the scene comprises depth measurements spanning a portion of a height of the image of the scene on a first axis and spanning a length of the image on a second axis.

Clause 5: The method of any one of Clauses 1 through 4, wherein the first depth map comprises a depth map of the scene having a lower resolution than a resolution of the image of the scene.

Clause 6: The method of any one of Clauses 1 through 5, wherein the taking one or more actions comprises controlling a motor vehicle based on the second depth map.

Clause 7: The method of any one of Clauses 1 through 5, wherein the taking one or more actions comprises: generating an extended reality scene combining the scene and one or more virtual scenes based on the second depth map; and displaying the extended reality scene on a display device.

Clause 8: The method of any one of Clauses 1 through 5, wherein the taking one or more actions comprises controlling a robot to interact with one or more physical objects in the scene based on the second depth map.

Clause 9: The method of any one of Clauses 1 through 8, wherein the first depth map comprises a coarse depth map and the second depth map comprises a finer depth map having finer detail than the coarse depth map.

Clause 10: A processing system comprising: a memory comprising computer-executable instructions and one or more processors configured to execute the computer-executable instructions and cause the processing system to perform a method in accordance with any one of Clauses 1-9.

Clause 11: A processing system, comprising means for performing a method in accordance with any one of Clauses 1-9.

Clause 12: A non-transitory computer-readable medium comprising computer-executable instructions that, when executed by one or more processors of a processing system, cause the processing system to perform a method in accordance with any one of Clauses 1-9.

Clause 13: A computer program product embodied on a computer-readable storage medium comprising code for performing a method in accordance with any one of Clauses 1-9.

ADDITIONAL CONSIDERATIONS

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method, comprising:
generating, through a segmentation neural network, a segmentation map based on an image of a scene, wherein the segmentation map comprises a plurality of segments, and wherein each segment of the plurality of segments is associated with one of a plurality of categories;
generating, through a first depth neural network, a first depth map of the scene based on a depth measurement of the scene;
generating a plurality of masks based on the segmentation map and the first depth map, each mask corresponding to one of the plurality of segments;
generating a plurality of enhanced depth masks based on the plurality of masks and three-dimensional coordinate information derived from the first depth map as inputs into a depth refinement neural network, wherein each enhanced depth mask of the plurality of enhanced depth masks corresponds to one of the plurality of segments;
combining the plurality of enhanced depth maps to form a second depth map of the scene;
taking one or more actions based on the second depth map of the scene.

2. The method of claim 1, wherein the depth refinement neural network generates each output mask of the plurality of enhanced depth masks based on a convolutional kernel configured to apply weights based on a proximity of pixels in the scene in a three-dimensional space.

3. The method of claim 1, wherein the depth measurement of the scene comprises depth measurements spanning a portion of a height of the image of the scene on a first axis and spanning a length of the image on a second axis.

4. The method of claim 1, wherein the first depth map comprises a depth map of the scene having a lower resolution than a resolution of the image of the scene.

5. The method of claim 1, wherein the taking one or more actions comprises controlling a motor vehicle based on the second depth map.

6. The method of claim 1, wherein the taking one or more actions comprises:
generating an extended reality scene combining the scene and one or more virtual scenes based on the second depth map; and
displaying the extended reality scene on a display device.

7. The method of claim 1, wherein the taking one or more actions comprises controlling a robot to interact with one or more physical objects in the scene based on the second depth map.

8. The method of claim 1, wherein the first depth map comprises a coarse depth map and the second depth map comprises a finer depth map having finer detail than the coarse depth map.

9. An apparatus, comprising:
a memory having executable instructions stored thereon; and
a processor configured to execute the executable instructions to cause the apparatus to:
generate, through a segmentation neural network, a segmentation map based on an image of a scene, wherein the segmentation map comprises a plurality of segments, and wherein each segment of the plurality of segments being associated with one of a plurality of categories;
generate, through a first depth neural network, a first depth map of the scene based on a depth measurement of the scene;
generate a plurality of masks based on the segmentation map and the first depth map, each mask corresponding to one of the plurality of segments;
generate a plurality of enhanced depth masks based on the plurality of masks and three-dimensional coordinate information derived from the first depth map as inputs into a depth refinement neural network, wherein each enhanced depth mask of the plurality of enhanced depth masks corresponds to one of the plurality of segments;
combine the plurality of enhanced depth maps to form a second depth map of the scene;
take one or more actions based on the second depth map of the scene.

10. The apparatus of claim 9, wherein the depth refinement neural network generates each output mask of the plurality of enhanced depth masks based on a convolutional kernel configured to apply weights based on a proximity of pixels in the scene in a three-dimensional space.

11. The apparatus of claim 9, wherein the depth measurement of the scene comprises depth measurements spanning a portion of a height of the image of the scene on a first axis and spanning a length of the image on a second axis.

12. The apparatus of claim 9, wherein the first depth map comprises a depth map of the scene having a lower resolution than a resolution of the image of the scene.

13. The apparatus of claim 9, wherein in order to take the one or more actions, the processor is configured to control a motor vehicle based on the second depth map.

14. The apparatus of claim 9, wherein in order to take the one or more actions, the processor is configured to:
generate an extended reality scene combining the scene and one or more virtual scenes based on the second depth map; and
display the extended reality scene on a display device.

15. The apparatus of claim 9, wherein in order to take the one or more actions, the processor is configured to control a robot to interact with one or more physical objects in the scene based on the second depth map.

16. The apparatus of claim 9, wherein the first depth map comprises a coarse depth map and the second depth map comprises a finer depth map having finer detail than the coarse depth map.

17. An apparatus, comprising:
means for generating, through a segmentation neural network, a segmentation map based on an image of a scene, wherein the segmentation map comprises a map segmenting the scene into a plurality of segments, each segment of the plurality of segments being associated with one of a plurality of categories;
means for generating, through a first depth neural network, a first depth map of the scene based on a depth measurement of the scene;
means for generating a plurality of masks based on the segmentation map and the first depth map, each mask corresponding to one of the plurality of segments;
means for generating a plurality of enhanced depth masks based on the plurality of masks and three-dimensional coordinate information derived from the first depth map as inputs into a depth refinement neural network, wherein each enhanced depth mask of the plurality of enhanced depth masks corresponds to one of the plurality of segments;
means for combining the plurality of enhanced depth maps to form a second depth map of the scene;
means for taking one or more actions based on the second depth map of the scene.

18. The apparatus of claim 17, wherein the depth refinement neural network is configured to generate each output mask of the plurality of enhanced depth masks based on a convolutional kernel configured to apply weights based on a proximity of pixels in the scene in a three-dimensional space.

19. The apparatus of claim 17, wherein the depth measurement of the scene comprises depth measurements spanning a portion of a height of the image of the scene on a first axis and spanning a length of the image on a second axis.

20. The apparatus of claim 17, wherein the first depth map comprises a depth map of the scene having a lower resolution than a resolution of the image of the scene.

21. The apparatus of claim 17, wherein the means for taking one or more actions comprises means for controlling a motor vehicle based on the second depth map.

22. The apparatus of claim 17, wherein the means for taking one or more actions comprises:
means for generating an extended reality scene combining the scene and one or more virtual scenes based on the second depth map; and
means for displaying the extended reality scene on a display device.

23. The apparatus of claim 17, wherein the means for taking one or more actions comprises means for controlling a robot to interact with one or more physical objects in the scene based on the second depth map.

24. The apparatus of claim 17, wherein the first depth map comprises a coarse depth map and the second depth map comprises a finer depth map having finer detail than the coarse depth map.

25. A non-transitory computer-readable medium having executable instructions stored thereon which, when executed by a processor, causes the processor to:
generate, through a segmentation neural network, a segmentation map based on an image of a scene, wherein the segmentation map comprises a map segmenting the scene into a plurality of segments, each segment of the plurality of segments being associated with one of a plurality of categories;
generate, through a first depth neural network, a first depth map of the scene based on a depth measurement of the scene;
generate a plurality of masks based on the segmentation map and the first depth map, each mask corresponding to one of the plurality of segments;
generate a plurality of enhanced depth masks based on the plurality of masks and three-dimensional coordinate information derived from the first depth map as inputs into a depth refinement neural network, wherein each enhanced depth mask of the plurality of enhanced depth masks corresponds to one of the plurality of segments;
combine the plurality of enhanced depth maps to form a second depth map of the scene;
take one or more actions based on the second depth map of the scene.

26. The non-transitory computer-readable medium of claim 25, wherein the depth refinement neural network generates each output mask of the plurality of enhanced depth masks based on a convolutional kernel configured to apply weights based on a proximity of pixels in the scene in a three-dimensional space.

* * * * *